United States Patent
Arai et al.

(10) Patent No.: US 8,342,670 B2
(45) Date of Patent: Jan. 1, 2013

(54) INKJET PRINTING METHOD AND INK SET

(75) Inventors: Sayako Arai, Tokyo (JP); Shunsuke Uozumi, Tokyo (JP); Shinichiro Shimura, Tokyo (JP)

(73) Assignee: Riso Kagaku Corporation, Tokyo (JP)

( * ) Notice: Subject to any disclaimer, the term of this patent is extended or adjusted under 35 U.S.C. 154(b) by 585 days.

(21) Appl. No.: 12/535,052

(22) Filed: Aug. 4, 2009

(65) Prior Publication Data

US 2010/0033524 A1 Feb. 11, 2010

(30) Foreign Application Priority Data

Aug. 5, 2008 (JP) ................................. 2008-201712
Jun. 11, 2009 (JP) ................................. 2009-140515

(51) Int. Cl.
*G01D 11/00* (2006.01)

(52) U.S. Cl. .......................................... 347/100; 347/95

(58) Field of Classification Search ................... 347/100, 347/95, 96, 102, 101; 106/31.6, 31.13, 31.27; 523/160.161

See application file for complete search history.

(56) References Cited

U.S. PATENT DOCUMENTS

| 6,062,674 A | 5/2000 | Inui et al. |
| 2001/0020964 A1* | 9/2001 | Irihara et al. ..................... 347/43 |
| 2005/0065235 A1* | 3/2005 | Bauer ........................... 523/160 |
| 2007/0081063 A1* | 4/2007 | Nakano et al. ................. 347/100 |
| 2007/0277699 A1* | 12/2007 | Bauer ........................... 106/31.6 |

FOREIGN PATENT DOCUMENTS

| JP | H08-281930 A1 | 10/1996 |
| JP | 2000-198263 A1 | 7/2000 |

OTHER PUBLICATIONS

Chemical Book; 2010; Poly allylamine / 30551-89-4 structure formula [CH2CH(CH2NH2)]n http://www.chemicalbook.com/ChemicalProductProperty_EN_CB0265021.htm.*
Office Action, apparently dated Nov. 17, 2010, issued in Chinese appln. 200910161918.3.
Seymour et al., Handbook of Organic Coatings, section 7.315 Dispersants, p. 103 (1990).
Schramm, The language of Colloid and Interface Science, p. 40 (dispersant) (1993).
Lewis, Sr., Hawley's Condensed Chemical Dictionary, 14th Edition, p. 415 (definition of dispersing agent) (2001).
Hyperdispersants Technology and Benefits, Trade Brochure from Lubrizol (2011).

* cited by examiner

*Primary Examiner* — Manish S Shah
(74) *Attorney, Agent, or Firm* — Fitch, Even, Tabin & Flannery, LLP

(57) ABSTRACT

In an inkjet printing system using an ink which includes a coloring material dispersed in a solvent, it is aimed that printing density is improved by thickening the ink on a printing medium so as to stay the coloring material on the surface of the printing medium. An inkjet printing method is provided, in which printing is performed by ejecting one of first and second inks onto a printing medium, and then successively ejecting the other ink so as to overlay it on the one ink, wherein the first ink includes at least a first organic solvent and an $\alpha,\beta$-unsaturated carbonyl compound, the second ink includes at least a second organic solvent and an organic compound reactive as a nucleophile with the $\alpha,\beta$-unsaturated carbonyl compound, and at least one of the first and second inks includes a coloring material.

18 Claims, No Drawings

INKJET PRINTING METHOD AND INK SET

CROSS-REFERENCE TO RELATED APPLICATIONS

This is U.S. application claims the benefit of foreign priority under 35 U.S.C. §119 based on Japanese Applications JP 2008-201712, filed Aug. 5, 2008, and JP 2009-140515, filed Jun. 11, 2009, the entire disclosures of which are hereby incorporated herein by reference.

TECHNICAL FIELD

The present invention relates to an inkjet printing method which improves printing density by causing inks to thicken on printing media so as to keep coloring materials on the surface of printing media, and also relates to an ink set used for the printing method.

BACKGROUND ART

Inkjet inks used for inkjet printing system are generally classified into aqueous inks and non-aqueous inks.

Aqueous inks comprise water as a solvent and thus easily provide printing images high in density and quality when plain paper is used as a printing medium, because the solvent easily permeates into the printing medium so that pigments are easily kept on the surface of the printing medium. On the other hand, aqueous inks are disadvantageous in that they easily cause the printing medium to generate curl and cockling, thereby affecting conveyance of the printing medium and producing a bad effect on high-speed inkjet printing.

Non-aqueous inks are generally classified into solvent inks composed mainly of a very-volatile organic compound as a solvent and oil inks composed mainly of a low-volatile organic compound as a solvent. Solvent inks are excellent in drying, but operating environment is limited because a large amount of solvents are volatilized. On the other hand, oil inks are excellent in permeability into printing media and drying when plain paper is used as printing media, and also volatize less solvents than aqueous inks and solvent inks. Thus, oil inks are advantageous in that clogging in ink nozzles is unlikely to occur, thereby reducing frequency of cleaning of ink nozzles, and thus are suitable for high-speed printing, particularly high-speed line head inkjet printing system.

However, oil inks are defective in that they are poor in separation of the coloring material and the solvent on printing media, and particularly when plain paper is used as printing media, both the coloring material and the solvent are easy to permeate into a gap between fibers of printing media, thereby causing deterioration of quality of printing images due to decrease of printing density, increase of strike through and bleeding of printing dots.

Conventionally, as a method for staying a coloring material and a solvent together on a surface of paper without permeation, it has been proposed for a aqueous ink that a reactive substance is contained in an ink whilst a treatment solution is provided which contains a substance reactive with the above substance, and the treatment solution is ejected onto the ink, whereby both substances are reacted on the surface of paper to cause aggregation of coloring materials, thereby making it difficult for the coloring materials to permeate into the paper (refers to patent Document 1 and Patent Document 2). However, no method exhibiting a similar effect has been proposed for non-aqueous inks.

Also, there has been proposed a printing system in which an ink containing an ultraviolet or electron-beam curable organic compound as a solvent is used, and the ink is ejected onto the printing medium and then irradiated with an ultraviolet beam or heated so as to render the ink to cure and stay on the surface of paper. However, it requires an irradiation device and a heating device, thereby making the device to be large-scaled and increasing electricity consumption.

[Patent Document 1] JP-A-H8-281930
[Patent Document 2] JP-A-2000-198263

DISCLOSURE OF THE INVENTION

Problem to be Solved by the Invention

The present invention relates to an inkjet printing system using an ink comprising a coloring material dispersed in a solvent, and aims at improving printing density by thickening the ink to inhibit ink permeation so as to stay the coloring material of the ink on a surface of paper in a manner different from the conventional techniques after the ink has been ejected onto a printing medium.

Means for Solving the Problem

As a result of diligent researches for the above mentioned object, the present inventors have found that the inkjet printing system in which printing is performed by ejecting one of first and second inks onto a printing medium, and then successively ejecting the other ink so as to overlay it on the one ink that has been ejected onto the printing medium, can be improved in image density and prevented from strike through and bleeding by allowing the first ink to contain at least a first organic solvent and an $\alpha,\beta$-carbonyl compound and the second ink to contain at least a second organic solvent and an organic compound reactive as a nucleophile with the $\alpha,\beta$-carbonyl compound, and allowing a coloring material to be contained in at least one of the first and second inks, so that when the first and second inks are ejected to overlap with each other on the printing medium, the above two compounds react with each other to thicken the ink, and the solvent which is not involved in the reaction is separated from the coloring material and permeates into the printing medium whereas the coloring material is stayed on a surface of the printing medium, and has finally completed the present invention.

That is, according to one aspect of the present invention, there is provided an inkjet printing method which comprises ejecting one of first and second inks onto a printing medium, and then successively ejecting the other ink so as to overlay it on the one ink, wherein the first ink comprises at least a first organic solvent and an $\alpha,\beta$-unsaturated carbonyl compound, and the second ink comprises at least a second organic solvent and an organic compound reactive as a nucleophile with the $\alpha,\beta$-unsaturated carbonyl compound, wherein at least one of the first and second inks comprises a coloring material.

According to another aspect of the present invention, there is provided an ink set for inkjet printing by ejecting one of first and second inks onto a printing medium, and then successively ejecting the other ink so as to overlay it on the one ink, comprising the first ink which comprises at least a first organic solvent and an $\alpha,\beta$-unsaturated carbonyl compound, and the second ink which comprises at least a second organic solvent and an organic compound reactive as a nucleophile with the $\alpha,\beta$-unsaturated carbonyl compound, wherein at least one of the first and second inks comprises a coloring material.

According to a preferable embodiment of the present invention, the $\alpha,\beta$-unsaturated carbonyl compound is a compound which contains at least two $\alpha,\beta$-unsaturated carbonyl groups in one molecule.

According to another preferable embodiment of the present invention, the organic compound reactive as a nucleophile with the α,β-unsaturated carbonyl compound is a compound containing at least one primary or secondary amino group in one molecule.

According to still another preferable embodiment of the present invention, the α,β-unsaturated carbonyl compound is a compound which contains at least two α,β-unsaturated carbonyl groups in one molecule, and the organic compound reactive as a nucleophile with the α,β-unsaturated carbonyl compound is a compound containing at least two primary or secondary amino groups in one molecule. In this case, a crosslinked and highly-gelled structure is formed so as to produce a high thickening effect due to the reaction between the two compounds, and thus image density is greatly improved.

Effects of the Invention

According to the present invention, the first ink comprises an α,β-unsaturated carbonyl compound, and the second ink comprises an organic compound reactive as a nucleophile with the α,β-unsaturated carbonyl compound. Thus, when printing is conducted by ejecting the first and second inks onto a printing medium so as to overlap and mix each other, both compounds react with each other so as to produce reactants high in molecular weight and thicken the ink, whereby the solvent contained in the ink is separated from the coloring material and permeates into the printing medium whilst the coloring material is kept on the surface of the printing medium. Consequently, image density is improved, and strike through and bleeding are prevented. The reaction between both compounds proceeds easily even in an organic solvent, but does not require heating or irradiation with a light or the like, nor require any polymerization initiator or strong catalyst.

BEST MODE FOR CARRYING OUT THE INVENTION

Hereinafter, the present invention will be described in detail.

1. The First Ink

The first ink used in the present invention is not particularly limited as long as it comprises at least a first organic solvent and an α,β-unsaturated carbonyl compound. Meanwhile, the first ink used in the present invention may further comprise a coloring material, a dispersing agent and another additive, as required.

1-1. The First Organic Solvent

The first organic solvent is not particularly limited as long as it functions as a solvent of an ink, that is, a vehicle, and can dissolve or disperse an α,β-unsaturated carbonyl compound, and may be any of volatile or non-volatile solvents. However, in the present invention, the first organic solvent is preferably composed mainly of a non-volatile solvent from the viewpoint of environment. The non-volatile solvent preferably has a boiling point of not less than 240° C.

As the non-volatile solvent, a known organic solvent can be used which may be water-insoluble or water-soluble. These can be used alone, or can be used in combination of two or more as long as they form a single phase.

1-1-1. Water-Insoluble Organic Solvents

The water-insoluble organic solvent includes hydrocarbon solvents, higher fatty acid ester solvents, higher fatty acid solvents, higher alcohol solvents, and the like. These can be used alone, or can be used in combination of two or more as long as they form a single phase.

The hydrocarbon solvent includes, for example, petroleum based hydrocarbon solvents including naphthenic, paraffinic and isoparaffinic ones. Concrete examples include ISOPAR and EXXOL (both trade names) available from Exxon Mobil Corporation, AF solvents (trade name) available from Nippon Oil Corporation, and SUNSEN and SUNPAR (both trade names) available from Japan Sun Oil., Ltd., and the like.

The higher fatty acid ester solvents includes, for example, fatty acid esters having 5 or more, preferably 9 or more and more preferably 12 to 32 carbon atoms in one molecule. Concrete examples include isodecyl isononanoate, isotridecyl isononanoate, isononyl isononanoate, isopropyl palmitate, hexyl palmitate, isooctyl palmitate, isostearyl palmitate, isooctyl isopalmitate, butyl stearate, hexyl stearate, isooctyl stearate, isopropyl isostearate, 2-octyldodecyl pivalate, methyl laurate, isopropyl laurate, isopropyl myristate, methyl oleate, ethyl oleate, isopropyl oleate, butyl oleate, hexyl oleate, methyl linoleate, ethyl linoleate, isobutyl linoleate, soybean oil methyl ester, soybean oil isobutyl ester, tall oil methyl ester, tall oil isobutyl ester, diisopropyl adipate, diisopropyl sebacate, diethyl sebacate, propylene glycol monocaprate, trimethylolpropane tri-2-ethylhexanoate, and glyceryl tri-2-ethylhexanoate.

The higher fatty acid solvent includes, for example, fatty acids having 4 or more, preferably 9-22 carbon atoms in one molecule. Concrete examples include isononanoic acid, isomyristic, acid, hexadecanoic acid, isopalmitic acid, oleic acid, and isostearic acid.

The higher alcohol solvent includes, for example, aliphatic alcohols having 12 or more carbon atoms in one molecule. Concrete examples include isomyristyl alcohol, isopalmityl alcohol, isostearyl alcohol, and oleyl alcohol.

1-1-2. Water-Soluble Organic Solvents

The water-soluble organic solvent includes, for example, glycol solvents, glycol ethers, acetates of glycol ethers, lower alcohols, glycerin, diglycerin, triglycerin, polyglycerins, imidazoridinone solvents, and 3-methyl-2,4-pentanediol. These can be used alone, or can be used in combination of two or more as long as they form a single phase.

The glycol solvent includes, for example, alkylene glycols such as ethylene glycol, diethylene glycol, triethylene glycol and propylene glycol.

The glycol ether includes alkylene glycol alkyl ether and polyalkylene glycol alkyl ether (both collectively referred to as (poly)alkylene glycol alkyl ether in this specification), and concrete examples thereof include compounds represented by the following formula (1).

$$R^1—O(C_2H_4—O)_n—R^2 \tag{1}$$

In formula (1), $R^1$ and $R^2$ each independently represent a hydrogen atom or an alkyl group having 1-6, preferably 4-6 carbon atoms, and n is an integer of 1 to 4.

Specific examples of (poly)alkylene glycol alkyl ethers represented by the above mentioned formula (1) include, for example, ethylene glycol monobutyl ether, diethylene glycol monomethyl ether, diethylene glycol monoethyl ether, diethylene glycol monopropyl ether, diethylene glycol monobutyl ether, triethylene glycol monopropyl ether, triethylene glycol monobutyl ether, triethylene glycol monohexyl ether, tetraethylene glycol monomethyl ether, tetraethylene glycol monoethyl ether, tetraethylene glycol monopropyl ether, tetraethylene glycol monobutyl ether, diethylene glycol diethyl ether, diethylene glycol dibutyl ether, triethylene glycol diethyl ether and triethylene glycol dibutyl ether.

Another example of (poly)alkylene glycol alkyl ethers include compounds represented by the following formula (2).

$$R^1—O(C_3H_6—O)_n—R^2 \qquad (2)$$

In formula (2), $R^1$ and $R^2$ each independently represent a hydrogen atom or an alkyl group having 1-6, preferably 4-6 carbon atoms, and n is an integer of 1 to 4.

Specific examples of (poly)alkylene glycol alkyl ethers represented by the above mentioned formula (2) include, for example, propylene glycol monobutyl ether, propylene glycol dibutyl ether, dipropylene glycol monomethyl ether, dipropylene glycol monoethyl ether, dipropylene glycol monopropyl ether, dipropylene glycol monobutyl ether, tripropylene glycol monopropyl ether, tripropylene glycol monobutyl ether, tetrapropylene glycol monomethyl ether, dipropylene glycol dibutyl ether and tripropylene glycol dibutyl ether.

The lower alcohol includes, for example, aliphatic alcohols having 1-6 carbon atoms in one molecule. Concrete examples include ethyl alcohol, propyl alcohol, isopropyl alcohol and butyl alcohol.

Of these water-soluble organic solvents, glycol solvents, glycol ethers, glycerin, diglycerin, triglycerin and polyglycerins are preferably used.

1-2. α,β-Unsaturated Carbonyl Compound

The α,β-unsaturated carbonyl compound is not particularly limited as long as it is capable of being dissolved or dispersed in the above first organic solvent, and functions as an electrophile in the Michael addition reaction represented by the following formula (3).

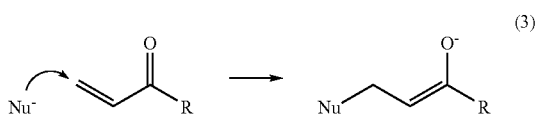

(3)

That is, an α,β-unsaturated carbonyl compound may be a compound having at least one α,β-unsaturated carbonyl group represented by $CH_2=CH—(CO)—$ in one molecule, and is preferably a compound having at least two α,β-unsaturated carbonyl groups in one molecule from the viewpoint of being easily gelated when the first and the second inks are mixed.

Concrete examples of the α,β-unsaturated carbonyl compound include (meth)acrylate diesters of aliphatic or alicyclic dihydric alcohols with 4-12 carbon atoms such as 1,6-hexanediol diacrylate, 1,9-nonanediol diacrylate and 1,10-decanediol diacrylate. Also, it includes, for example, di(meth) acrylates having an alkyleneoxide group such as ethoxylated bisphenol A diacrylate, propoxylated ethoxylated bisphenol A diacrylate and polypropyleneglycol diacrylate. Further, it includes, for example, triesters and tetraesters such as ethoxylated glycerin triacrylate, pentaerythritol triacrylate and ditrimethylolpropane tetraacrylate. From the viewpoint of viscosity of the resultant ink, diesters are particularly preferable.

Content of an α,β-unsaturated carbonyl compound is preferably not less than 10 mass % and not more than 60 mass %, and more preferably not less than 25 mass % and not more than 50 mass % relative to the total amount of the first ink. When the content is less than 10 mass %, improvement of image density becomes insufficient to cause strike through and bleeding. When the content exceeds 60 mass %, dispersion stability of coloring materials in the ink deteriorates, or adjustment of ink viscosity becomes difficult.

1-3. Coloring Materials

In the present invention, at least one of the first and second inks comprises a coloring material. Therefore, if the second ink does not comprise a coloring material, the first ink should comprise a coloring material. If the second ink comprises a coloring material, the first ink may comprise or may not comprise a coloring material.

The coloring material used in the present invention is not particularly limited as long as it is capable of being dissolved or dispersed in a solvent to be used, but is preferably a pigment. Pigments are usually easy to be aggregated and have an effect of fillers on printing media. By promoting the aggregation in accordance with the printing method of the present invention, pigments are made easier to stay on the surface of printing media, whereby improvement in image density and prevention of strike through and bleeding can be achieved effectively.

As the pigment, pigments generally used in the technical field of printing, including organic and inorganic pigments, can be used without any particular limitation. Examples thereof which can preferably be used include carbon black, cadmium red, chromium yellow, cadmium yellow, chromium oxide, viridian, titanium cobalt green, ultramarine blue, Prussian blue, cobalt blue, azo pigments, phthalocyanine pigments, quinacridone pigments, isoindolinone pigments, dioxadine pigments, threne pigments, perylene pigments, thioindigo pigments, quinophthalone pigments and metal complex pigments.

These pigments may be used alone or in combination of two or more.

The pigment is contained preferably in an amount of 0.01 to 20 wt. % based on the total weight of the ink.

1-4. Dispersing Agents

The dispersing agent used in the present invention can be properly selected from known dispersing agents in accordance with organic solvents and coloring materials to be used.

The dispersing agent which can be used for dispersing the above pigment in the above organic solvent include, for example, a hydroxyl group-containing carboxylic acid ester, a salt of a long-chain polyaminoamide and a high-molecular weight acidic ester, a salt of a high molecular weight polycarboxylic acid, a salt of a long-chain polyaminoamide and a polar acidic ester, a high molecular weight unsaturated acidic ester, a high molecular weight copolymer, a modified polyurethane, a modified polyacrylate, a polyetherester type anionic surfactant, a naphthalene sulfonic acid formalin condensate salt, a polyoxyethylene alkylphosphoric acid ester, a polyoxyethylene nonylphenyl ether, a polyesterpolyamine, a stearylamine acetate and the like. Of these, high molecular weight dispersing agents are preferably used.

Examples of such pigment-dispersing agents include SOLSPERSE 5000 (phthalocyanine ammonium salt based), 11200, 22000, 24000, and 28000 (all trade names) available from Lubrizol Japan Ltd.; EFKA 400, 401, 402, 403, 450, 451, 453 (modified polyacrylate), 46, 47, 48, 49, 4010, 4055 (modified polyurethane) (all trade names) available from Efka Chemicals; DEMOLP, EP, POIZ520, 521, 530, HOMOGENOLL-18 (polycarboxylate polymer type surfactants) (all trade names) available from Kao Corporation; DISPARLON KS-860, KS-873N4 (high molecular weight polyester amine salt) (all trade names) available from Kusumoto Chemicals, Ltd.; and DISCOL 202, 206, OA-202, OA-600 (multi chain polymer based nonionic) (all trade names) available from Daiichi Kogyo Seiyaku Co., Ltd.

Of the above pigment-dispersing agents, a polyamide-based dispersing agent that has a pectinated structure constituted by a plurality of side chains composed of polyester is preferably used. The polyamide-based dispersing agent that has a pectinated structure constituted by a plurality of side chains composed of polyester is a compound which has a main chain containing many nitrogen atoms such as polyethylene-imine and has a plurality of side chains that are bonded to the nitrogen atoms through amide-linkage in which the side chains are polyesters. Examples thereof include dispersing agents with a structure that has a main chain formed of polyalkyleneimine such as polyethyleneimine to which poly(carbonyl-$C_{3-6}$-alkyleneoxy) chains are bonded as side chains through amide-linkage in which the poly(carbonyl-$C_{3-6}$-alkyleneoxy) chains each contain 3 to 80 carbonyl-$C_{3-6}$-alkyleneoxy groups, as is disclosed in JP-A-H5-177123 and the corresponding U.S. Pat. No. 4,645,611 the disclosure of which is incorporated herein by reference. The above SOLSPERSE 11200 and SOLSPERSE 28000 (all trade names) available from Lubrizol Japan Ltd. correspond to the polyamide-based dispersing agent having such a pectinated structure.

Content of the above dispersing agents only has to be an amount in which the above pigment can be sufficiently dispersed in the ink, and may be set properly.

1-5. Other Components

In addition to the above first organic solvent, coloring material and dispersing agent, other components such as dyes, surfactants, fixing agents and antiseptics can be added to the first ink of the present invention as long as they do not adversely affect the property of the ink.

1-6. Production Method of the Ink

The first ink of the present invention can be prepared by putting the whole or part of the components in a known dispersing machine such as a beads mill to obtain a dispersion and if necessary passing it through a known filtering machine such as a membrane filter. Specifically, the ink can be prepared by previously mixing part of the solvent with the whole of the α,β-unsaturated carbonyl compound, the coloring material and the dispersing agent uniformly and dispersing the mixture in a dispersing machine, and then adding the rest of the components to the resulting dispersion followed by filtration.

1-7. Properties of the Ink

Viscosity at 23° C. of the inkjet ink of the present invention thus produced is adjusted to preferably 5 to 30 mPa·s, more preferably 7 to 14 mPa·s, which is suitable for ejecting the ink from an inkjet head nozzle. Preferably, the solidifying point of the ink is adjusted to −5° C. or lower so that the ink dose not freeze under storage conditions.

2. The Second Ink

The second ink used in the present invention is not particularly limited as long as it comprises at least a second organic solvent and an organic compound reactive as a nucleophile with the α,β-unsaturated carbonyl compound. Meanwhile, the second ink used in the present invention may further comprise a coloring material, a dispersing agent and another additive, as required.

2-1. The Second Organic Solvent

The second organic solvent is not particularly limited as long as it functions as a solvent of an ink, that is, a vehicle, and can dissolve or disperse an organic compound reactive as a nucleophile with the α,β-unsaturated carbonyl compound, and may be any of volatilize or non-volatilize solvents. However, in the present invention, the second organic solvent is preferably composed mainly of a non-volatile solvent from the viewpoint of environment. The non-volatilize solvent preferably has a boiling point of not less than 240° C.

The second organic solvent can be properly selected from the organic solvents described above concerning the first organic solvent.

The second organic solvent may be the same as the first organic solvent, or may be different from the first organic solvent. However, the first ink and the second ink should be mixed together so as to allow the compounds contained in these inks to react with each other during printing. Thus, when the second organic solvent is different from the first organic solvent, the second organic solvent preferably has miscibility to some extent with the first organic solvent. Concretely, the difference in solubility parameter between the first organic solvent and the second organic solvent is preferably not less than 1.0 $(cal/cm^3)^{1/2}$ and not more than 6.0 $(cal/cm^3)^{1/2}$. By use as the second organic solvent of an organic solvent having a difference in solubility parameter from the first organic solvent of not less than 1.0 $(cal/cm^3)^{1/2}$, the equilibrium state of pigment dispersion in the ink is destroyed when the first and second inks are mixed together on printing media. In combination with the reaction of the above two compounds, this promotes pigment aggregation, thereby more effectively attaining the improvement of image density and prevention of strike through and bleeding.

2-2. The Organic Compound Reactive as a Nucleophile with the α,β-Unsaturated Carbonyl Compound The organic compound reactive as a nucleophile with the α,β-unsaturated carbonyl compound is a compound shown as $Nu^-$ in the above formula (3), and is not particularly limited as long as it is a compound which is capable of reacting with and bonding to the α,β-unsaturated carbonyl compound as a nucleophile in the Michael addition reaction represented by the above formula (3).

Such an organic compound reactive as a nucleophile includes, for example, a compound with at least one primary or secondary amine in one molecule, and preferably a compound with at least two primary or secondary amines in one molecule. When the compound with at least two primary or secondary amines in one molecule is used, it is preferable to use a compound with at least two unsaturated carbonyl groups in one molecule as an α,β-unsaturated carbonyl compound contained in the first organic solvent. In this case, when the first ink and the second ink are mixed together so as to allow the two compounds to react on printing media, a crosslinked structure is formed to cause gelation, and thus pigment aggregation is promoted so that the effect of the present invention can be obtained more easily.

Concrete examples of a compound with at least two primary or secondary amines in one molecule include diamines such as ethylenediamine, hexamethylenediamine, fluorenediamine, tallow propylenediamine and polyoxypropylenediamine, and a high molecular weight amines with many primary or secondary amines in one molecule such as polyallylamine, polyvinylamine, polyalkyleneimine, polyvinylpyridine, polydiallylamine, polyamide polyamine, polyamidine and hydrazine polyacrylate. Of these, a compound represented by the formula R—NH—$CH_2CH_2CH_2$—$NH_2$ and a primary amine-grafted polymer which has many —$NH_2$ groups grafted to side chains thereof are preferable.

Content of such an organic compound reactive as a nucleophile is preferably not less than 2.5 mass % and not more than 40 mass % and more preferably not less than 5 mass % and not more than 30 mass % relative to the total of the second ink. When the content is less than 2.5 mass %, the improvement of image density becomes insufficient, thereby causing strike through and bleeding. When the content exceeds 40 mass %, dispersing state of coloring materials may be badly affected if coloring materials are contained, or ink viscosity may be increased, thereby deteriorating inkjet ejection.

2-3. Other Components

According to the present invention, at least one of the first and second inks comprises a coloring material. Therefore, when the first ink does not comprise any coloring material, the second ink should comprise a coloring material. If the first ink comprises a coloring material, the second ink may comprise or may not comprise a coloring material. However, even if the first ink comprises a coloring material, it is preferable that the second ink comprises a coloring material and a dispersing agent for the coloring material in order to improve printing density when it is ejected so as to overlap with the first ink.

As the coloring material, can be used one which is properly selected from those described above concerning the first solvent, and pigments are preferably used. In order to improve printing density, it is usually preferable that the second ink contains the same coloring material as that contained in the first ink. Black inks can be improved in printing density by printing a cyan ink so as to overlap with the black ink. Therefore, for example, when the first ink comprises carbon black and/or copper phthalocyanine, printing density of black or cyan color can be improved by using the second ink which comprises carbon black and/or copper phthalocyanine. Usually, a color inkjet ink has respective inks of cyan (C), yellow (Y), magenta (M) and black (K). Thus, the present invention can be easily practiced by providing one of the cyan (C) ink and the black (K) ink as the first ink of the present invention, and providing the other ink as the second ink of the present invention.

As the dispersing agent, can be used one which is properly selected from those described above concerning the first solvent, but it is necessary to appropriately select one that fits the selected second solvent if the first and second solvents are different from each other in nature.

In addition to the above solvent, coloring material and dispersing agent, other components such as dyes, surfactants, fixing agents and antiseptics can be added to the second ink of the present invention as long as they do not adversely affect the property of the ink.

2-4. Production Method and Properties of the Ink

As to the production method and properties of the second ink of the present invention, those described above concerning the first ink are applied thereto as they are.

3. Inkjet Printing Method

The inkjet printing method of the present invention is conducted by ejecting one of the first and second inks onto a printing medium, and then successively ejecting the other ink so as to overlay it on the one ink. Since it is essential in the present invention to react a compound contained in the first ink with a compound contained in the second ink on the printing medium, it is necessary to print both inks to overlap with each other by successively ejecting the other ink immediately after the one ink has been ejected and before the one ink permeates into the inside of the printing medium.

Meanwhile, it is advantageous to constitute and market an ink set comprising at least the first and second inks in order to make it easier to carry out the inkjet printing method of the present invention.

For example, when an ordinary inkjet printer equipped with an ink head having ejection nozzles for cyan (C), yellow (Y), magenta (M) and black (K) is used to conduct the printing method of the present invention in order to improve printing density of black color, the printing method of the present invention can be easily conducted by preparing a black ink as the first ink and a cyan ink as the second ink, and controlling the inkjet printer so that when the black ink is ejected onto a printing medium, the cyan ink is successively ejected so as to overlay it on the site which has been printed by the black ink. Conversely, the black ink may be prepared as the second ink and the cyan ink as the first ink. Further, two kinds of black ink may be equipped with a printer whilst one is prepared as the first ink and the other as the second ink.

In the present invention, the printing medium is not particularly limited, and may be plain paper, glossy paper, specialty paper, fabrics, films, OHP sheets, and the like. Especially, according to the present invention, even when oil inks are used for printing plain paper, coloring materials such as pigments stay on the surface of printing paper without permeating through the printing paper, and thus great advantages result including improvement of printing density and decrease in strike through.

EXAMPLE

Hereinafter, the present invention will be described in detail by way of Examples and Comparative Examples, however, the present invention is not limited to these examples.

Production Examples

The First Ink Nos. 1-5, the Second Ink Nos. 1-4

The components shown in Table 1 or 2 were premixed in the ratio shown in Table 1 or 2, and then the mixture was dispersed in a beads mill (using zirconium beads having a diameter ($\phi$) of 0.5 mm). The resulting dispersion was filtered with a membrane filter (having pores of 3 μm in diameter) to prepare an inkjet ink. The amount of each component to be blended is indicated in mass % in Tables 1 and 2.

Examples 1-5, Comparative Examples 1-3

Each one ink shown in Table 3 was selected from each of the first ink and the second ink shown in Tables 1 and 2, and introduced to each of the first ink ejection route and the second ink ejection route of the inkjet printer HC5500 (trade name; manufactured by RISO KAGAKU CORPORATION). Using plain paper (RISO-YOSHI, Usukuchi (trade name; manufactured by RISO KAGAKU CORPORATION)) as printing paper, solid image was printed such that ink dots ejected from the first ink ejection route onto the printing paper were overlaid with ink dots ejected from the second ink ejection route. Printing density (OD) values of the resulting print and its strike through were measured with an optical densitometer (RD920: manufactured by Macbeth) and evaluated in accordance with the following standards. Also, bleeding of characters and thin lines occurring on the print was evaluated visually in accordance with the following standards. The results are shown in Table 3.

Evaluation Standards for Printing Density

◉: $1.2 \leq$ OD value

○: $1.1 \leq$ OD value$<1.2$ x: OD value$<1.1$

Evaluation Standards for Strike Through of Prints

◉: OD value$\leq 0.25$

○: $0.25<$ OD value$\leq 0.3$

Δ: $0.3<$ OD value$\leq 0.4$ x: OD value$>0.4$

Evaluation Standards for Bleeding of Characters and Thin Lines
⊚: no bleeding
◯: a little bleeding
x: apparent bleeding

TABLE 1

| Composition (mass %) | | First ink | | | | |
|---|---|---|---|---|---|---|
| | | No. 1 | No. 2 | No. 3 | No. 4 | No. 5 |
| Carbon black | MA-11 | 8 | 8 | 8 | 8 | 8 |
| Pigment dispersing agent | SOLSPERSE 11200 | 2 | 2 | 2 | 2 | 2 |
| | SOLSPERSE 28000 | 2 | 2 | 2 | 2 | 2 |

TABLE 1-continued

| Composition (mass %) | | First ink | | | | |
|---|---|---|---|---|---|---|
| | | No. 1 | No. 2 | No. 3 | No. 4 | No. 5 |
| α,β-unsaturated carbonyl compound | 1,9-nonanediol diacrylate | 30 | 50 | 15 | 8 | |
| Organic solvent | Methyl oleate | 30 | 23 | 38 | 43 | 43 |
| | FINEOXOCOL 140N | 4.5 | 4.5 | 4.5 | 4.5 | 4.5 |
| | AF SOLVENT No. 7 | 23 | 10 | 30 | 32 | 40 |
| Antiseptics | | 0.5 | 0.5 | 0.5 | 0.5 | 0.5 |
| Total | | 100 | 100 | 100 | 100 | 100 |

TABLE 2

| Composition (mass %) | | Second ink | | | |
|---|---|---|---|---|---|
| | | No. 1 | No. 2 | No. 3 | No. 4 |
| Nucleophile | DIAMINE RRT | 30 | | | |
| | POLYMENT NK-380 (30% TEGmME solution) | | 15 | 5 | |
| Organic solvent | Diethyleneglycol-mono-ethylether | 49.5 | 64.5 | 74.5 | 74.5 |
| | Isooctyl palmitate | 20 | 20 | 20 | 25 |
| Anticeptics | | 0.5 | 0.5 | 0.5 | 0.5 |
| Total | | 100 | 100 | 100 | 100 |

Symbols in Tables 1 and 2 mean the followings;

MA-11: carbon black available from Mitsubishi Chemical Corporation, MA-11 (trade name)
SOLSPERSE 11200: a pigment dispersing agent available from Lubrizol Japan Ltd, comprising 50% of aliphatic hydrocarbon (non-polar) solvent, SOLSPERSE 11200 (trade name).
SOLSPERSE 28000: a pigment dispersing agent available from Lubrizol Japan Ltd, SOLSPERSE 28000 (trade name).
FINEOXOCOL 140N: a higher alcohol available from NISSAN CHEMICAL INDUSTRIES, LTD., FINEOXOCOL140N (trade name)
AF SOLVENT No. 7: petroleum based hydrocarbon solvent available from Nippon Oil Corporation, AF7 (trade name).
DIAMIN RRT: tallow propylene diamine available from KAO CHEMICAL, DIAMIN RRT (trade name)
POLYMENT NK-380: primary amine graft polymer available from NIPPON SHOKUBAI CO., LTD., POLYMENT NK-380 (trade name)

TABLE 3

| | | Example 1 | Example 2 | Example 3 | Example 4 | Example 5 | Comparative Example 1 | Comparative Example 2 | Comparative Example 3 |
|---|---|---|---|---|---|---|---|---|---|
| Ink set | First ink | No. 1 | No. 1 | No. 2 | No. 3 | No. 2 | No. 5 | No. 5 | No. 4 |
| | Second ink | No. 1 | No. 2 | No. 2 | No. 2 | No. 3 | none | No. 4 | No. 4 |
| Evaluation items | Image density | ◯ | ⊚ | ⊚ | ⊚ | ◯ | X | X | X |
| | Strike through | ⊚ | ⊚ | ⊚ | ⊚ | ⊚ | X | X | X |
| | Characters and thin lines | ◯ | ⊚ | ⊚ | ⊚ | ◯ | X | X | X |

The results of Table 3 have revealed as follows:

In Examples 1-5 in which the first ink comprising an α,β-unsaturated carbonyl compound was overlaid by printing the second ink comprising a nucleophile for the above compound, image density was improved, but neither strike through of prints nor bleeding of characters and thin lines occurred.

In contrast, in Comparative Example 1 in which the first ink comprising no α,β-unsaturated carbonyl compound alone was printed, image density was inferior, and strike through of prints and bleeding of characters and thin lines occurred.

In addition, in Comparative Example 2 in which the first ink comprising no α,β-unsaturated carbonyl compound was overlaid by printing the second ink comprising no nucleophile, image density was insufficient, and strike through of prints and bleeding of characters and thin lines occurred. Also, the results of Comparative Example 3 in which an experiment was carried out in the same manner as in Comparative Example 2 except that the first ink comprised an α,β-unsaturated carbonyl compound were the same as that of Comparative Example 2.

INDUSTRIAL APPLICABILITY

The inkjet printing method and ink set of the present invention can be easily practiced in an inkjet printer which can print by successively ejecting the first and second inks from a nozzle head so as to overlay them on a printing medium, and thus can be used widely in the field of inkjet printing.

The invention claimed is:

1. An inkjet printing method which comprises ejecting one of first and second inks onto a printing medium, and then successively ejecting the other ink so as to overlay it on the one ink, wherein the first ink comprises at least a first organic solvent and an α,β-unsaturated carbonyl compound, the second ink comprises at least a second organic solvent and an organic compound reactive as a nucleophile with the α,β-unsaturated carbonyl compound, and at least one of the first and second inks comprises a coloring material, wherein the organic compound reactive as a nucleophile with the α,β-unsaturated carbonyl compound constitutes not less than 2.5 mass % and not more than 30 mass % of the total amount of the second ink.

2. An inkjet printing method according to claim 1, wherein the first and second organic solvents are the same organic solvent.

3. An inkjet printing method according to claim 1, wherein the first and second organic solvents are organic solvents which are different from but miscible with each other.

4. An inkjet printing method according to claim 3, wherein the difference in solubility parameter between the first and second organic solvents is not less than 1.0 $(cal/cm^3)^{1/2}$ and not more than 6.0 $(cal/cm^3)^{1/2}$.

5. An inkjet printing method according to claim 1, wherein the α,β-unsaturated carbonyl compound is a compound containing at least two α,β-unsaturated carbonyl groups in one molecule.

6. An inkjet printing method according to claim 5, wherein the α,β-unsaturated carbonyl compound constitutes not less than 10 mass % and not more than 60 mass % of the total amount of the first ink.

7. An inkjet printing method according to claim 1, wherein the organic compound reactive as a nucleophile with the α,β-unsaturated carbonyl compound is a compound containing at least one primary or secondary amino group in one molecule.

8. An inkjet printing method according to claim 5, wherein the organic compound reactive as a nucleophile with the α,β-unsaturated carbonyl compound is a compound containing at least two primary or secondary amino groups in one molecule.

9. An ink set for inkjet printing by ejecting one of first and second inks onto a printing medium, and then successively ejecting the other ink so as to overlay it on the one ink, comprising
the first ink which comprises at least a first organic solvent and an α,β-unsaturated carbonyl compound, and
the second ink which comprises at least a second organic solvent and an organic compound reactive as a nucleophile with the α,β-unsaturated carbonyl compound,
wherein at least one of the first and second inks comprises a coloring material, and
wherein the organic compound reactive as a nucleophile with the α,β-unsaturated carbonyl compound constitutes not less than 2.5 mass % and not more than 30 mass % of the total amount of the second ink.

10. An ink set for inkjet printing according to claim 9, wherein the first and second organic solvents are the same organic solvent.

11. An ink set for inkjet printing according to claim 9, wherein the first and second organic solvents are organic solvents which different from but miscible with each other.

12. An ink set for inkjet printing according to claim 11, wherein the difference in solubility parameter between the first and second organic solvents is not less than 1.0 $(cal/cm^3)^{1/2}$ and not more than 6.0 $(cal/cm^3)^{1/2}$.

13. An ink set for inkjet printing according to claim 9, wherein the α,β-unsaturated carbonyl compound is a compound containing at least two α,β-unsaturated carbonyl groups in one molecule.

14. An ink set for inkjet printing according to claim 13, wherein the α,β-unsaturated carbonyl compound constitutes not less than 10 mass % and not more than 60 mass % of the total amount of the first ink.

15. An ink set for inkjet printing according to claim 9, wherein the organic compound reactive as a nucleophile with the α, β-unsaturated carbonyl compound is a compound containing at least one primary or secondary amino group in one molecule.

16. An ink set for inkjet printing according to claim 13, wherein the organic compound reactive as a nucleophile with the α,β-unsaturated carbonyl compound is a compound containing at least two primary or secondary amino groups in one molecule.

17. An inkjet printing method according to claim 1, wherein the organic compound reactive as a nucleophile with the α,β-unsaturated carbonyl compound is R—NH—$CH_2CH_2CH_2$—$NH_2$ and a primary amine-grafted polymer having —$NH_2$ groups grafted to side chains of said polymer.

18. An inkjet printing method which comprises ejecting one of first and second inks onto a surface of a printing medium, and then successively ejecting the other ink so as to overlay it on the one ink, wherein the first ink comprises at least a first organic solvent and an α,β-unsaturated carbonyl compound, the second ink comprises at least a second organic solvent and an organic compound reactive as a nucleophile with the α,β-unsaturated carbonyl compound, and at least one of the first and second inks comprises a coloring material, allowing the nucleophile to react with the α,β-unsaturated carbonyl compound to thereby thicken the ink, and allowing the solvents which are not involved in the reaction separate from the coloring material and permeate the printing medium, leaving the coloring material on the surface of the printing medium, wherein the nucleophile is selected from the group consisting of ethylenediamine, hexamethylenediamine, fluorenediamine, tallow propylenediamine and polyoxypropylenediamine, polyallylamine, polyvinylamine, polyalkyleneimine, polyvinylpyridine, polydiallylamine, polyamide polyamine, polyamidine, and hydrazine polyacrylate, and wherein the organic compound reactive as a nucleophile with the α,β-unsaturated carbonyl compound constitutes not less than 2.5 mass % and not more than 30 mass % of the total amount of the second ink.

* * * * *